Patented Nov. 15, 1932

1,887,743

UNITED STATES PATENT OFFICE

PAUL VILLAIN, OF DULWICH, LONDON, ENGLAND

MANUFACTURE OF TRANSPARENT OR OPAQUE TOILET AND MEDICATED SOAPS

No Drawing. Application filed April 16, 1929, Serial No. 355,660, and in Great Britain April 26, 1928.

This invention relates to the manufacture of solid perfumed toilet soap and, according thereto, there is incorporated, in the process of saponification of the fat constituent with alkali, a composition of aromatic odour comprising terpenes, resins and floral wax homogeneously emulsified with a suitable emulsifying agent.

By means of the invention there is produced an increase of the aromatic value and the fixing of the perfume in the soap, and also an increase in the detergency of the soap.

The said composition may consist of a terpene or terpenes with equal parts of resinoids, resinous perfumes, synthetic resins—viz.; resins made from phenols, thiourea ($NH_2.CS.NH_2$), urea, acroleins—or colophony, dissolved in an equal weight of methyl alcohol or any suitable solvent, viz., diacetone, cyclohexanol, propyl alcohol, isopropyl alcohol, monobutyl alcohol, ethylene glycol, or trichlorethylene to which 10% glycerine has been added with 5% sulphoricinoleate of ammonia, or with any well known emulsifiers; the whole mixture is heated from 70° to 90° C., and stirred well in order to ensure a completely homogeneous clear emulsion. In so doing, I practically produce an aromatic resinous composition which is dissolved in the soap by complete saponification.

For a soap base intended for a specific perfume, a selection must first be made of the terpenes in order not to clash with the nature of scent required—that is to say, for an eau de Cologne toilet soap I select the terpenes and residues from distillation and terpene extraction, in proportion to their aromatic value and corresponding to the essential oils, flower oils, synthetic perfume bases which will enter into the composition of an eau de Cologne perfume for toilet soap. For example:—

| Formula for an eau de Cologne soap as hitherto made with essential oils | Approximate terpenes contents | Formula for an eau de Cologne soap made according to the invention with corresponding terpene hydrocarbons, viz., terpenes from deterpenation of essential oils, etc. |
|---|---|---|
| 25 bergamot oil | 50% | 12 terpene of bergamot. |
| 30 lemon oil | 90% | 54 terpene of lemon. |
| 5 citronella oil | 25% | 4 terpene of citronella. |
| 5 geranium oil | 25% | 4 terpene of geranium. |
| 10 lavender oil | 25% | 8 terpene of lavender. |
| 10 petit-grain oil | 35% | 6 terpene of petit-grain. |
| 7 rosemary oil | 60% | 3 terpene of rosemary. |
| 8 neroli oil | | 9 aurantiene (orange terpenes, separated in the manufacture of terpeneless oils). |
| 100 parts by weight. 1 to 1½% of above composition is usually added to 100 lbs. soap base. | | 100 parts by weight. 5 to 30% of above composition will be required to form an adequate aromatic resinous composition. |

Consequently for a 100 kilograms of soap base destined for an eau de Cologne soap derived from 65 kilograms of tallow and 20 kilograms of copra to which it would otherwise have been necessary to add 15% ordinary rosin, the mixture comprising terpenes and producing an equivalent resinous composition to replace the 15% ordinary rosin will consist of the following:—

8 to 10 kilograms of the mixture of terpenes, as in the formula according to the invention, 6 to 4 kilograms of synthetic resin or ordinary resin, 1 kilogram of gum benzoin and 500 grams of wax residue from orange flower oil extracted by solvent.

The total mixture is put in a small enamelled jacketed pan (the resins and resinoids having previously been reduced to powder) and the following mixture added to act as a diluent and favour emulsification:—

8 kilograms of industrial methylated spirit containing 80 per cent. by weight of absolute alcohol.
  7 kilograms of cyclohexanol or propyl alcohol.
  1.5 kilograms of glycerine.
  1 kilogram of sulphoricinoleate of ammonia.

17.5 kilograms.

The whole mixture is heated gradually to 80° C., and stirred well in order that the same shall become a homogeneous, clear emulsion (filtered if necessary) and is then added to the above soap base as described when same is "boiling on strength" (i. e. boiling to complete saponification) additional caustic soda solution being added, if sufficient excess is not already present in the pan, and saponification completed. As much as 30% of mixture (terpenes mixed with resins) as treated above can be added to a soap base provided alkali is left in the pan or added to the soap in sufficient quantity to saponify the whole. The soap is then poured into frames to solidify, passed through the flaking machine, and dried, leaving only 10% to 12% moisture.

For a transparent soap, the flakes will be transferred to an ordinary vacuum still with reflux (to recover part of the solvent) and will be remelted with 40% to 50% of industrial methylated spirit containing 80 per cent. by weight of absolute alcohol to which is added 8% to 10% glycerine, the whole brought to a temperature of 80° C., to effect solution, raised gradually to 97° C., and boiled under 5% increase of pressure above atmospheric pressure for three hours. When the soap mixture is clear and transparent, steam is shut off, the mixture is allowed to cool to 75° C., and 1% to 2% of eau de Cologne composition made of essential oils in the hitherto known manner is added, and the whole is stirred well and poured into frames or moulds.

As much as 30% of the aromatic resinous composition, as manufactured by my invention may be added to the soap base.

What I claim is:—

The manufacture of solid perfumed toilet soap by incorporating, in the process of saponification of the fat constituent with alkali, a composition of aromatic odour comprising terpenes, resins and floral wax homogeneously emulsified with a suitable emulsifying agent.

PAUL VILLAIN.